(12) United States Patent
Gupta

(10) Patent No.: US 12,093,385 B2
(45) Date of Patent: Sep. 17, 2024

(54) ZERO DWELL TIME PROCESS LIBRARY AND SCRIPT MONITORING

(71) Applicant: Virsec Systems, Inc., San Jose, CA (US)

(72) Inventor: Satya V. Gupta, Dublin, CA (US)

(73) Assignee: VIRSEC SYSTEMS, INC., San Jose, CA (US)

( * ) Notice: Subject to any disclaimer, the term of this patent is extended or adjusted under 35 U.S.C. 154(b) by 282 days.

(21) Appl. No.: 17/646,555

(22) Filed: Dec. 30, 2021

(65) Prior Publication Data

US 2022/0207142 A1    Jun. 30, 2022

Related U.S. Application Data

(60) Provisional application No. 63/132,050, filed on Dec. 30, 2020.

(51) Int. Cl.
| | | |
|---|---|---|
| *G06F 21/56* | (2013.01) | |
| *G06F 21/52* | (2013.01) | |
| *G06F 21/64* | (2013.01) | |

(52) U.S. Cl.
CPC ............ *G06F 21/565* (2013.01); *G06F 21/52* (2013.01); *G06F 21/64* (2013.01); *G06F 2221/033* (2013.01)

(58) Field of Classification Search
USPC .......................................................... 726/23
See application file for complete search history.

(56) References Cited

U.S. PATENT DOCUMENTS 11,537,716 B1 *  12/2022  Choudhary ............. H04L 63/14
2005/0262576 A1   11/2005  Gassoway
(Continued)

FOREIGN PATENT DOCUMENTS

EP            3347850 A1    7/2018
WO   WO-2020075303 A1 *   4/2020   ........... G06F 21/105
(Continued)

OTHER PUBLICATIONS

Breitenbacher, D., et al., "HADES-IoT: A Practical and Effective Host-Based Anomaly Detection System for IoT Devices (Extended Version)", IEEE Internet of Things Journal, vol. 9, No. 2, 2021, pp. 9640-9658.
(Continued)

*Primary Examiner* — Sakinah White Taylor
(74) *Attorney, Agent, or Firm* — Hamilton, Brook, Smith & Reynolds, P.C.

(57) ABSTRACT

Embodiments provide improved functionality to monitor processes. One such embodiment is directed to a system that includes a centralized database storing approved file signatures. The system also includes a processor that is configured, in response to a user request to run an executable file, to suspend a process implementing execution of the executable file. In turn, the processor determines a signature of the executable file and compares the determined signature of the executable file to the approved file signatures stored in the centralized database. Then, the processor maintains or stops suspension of the process based on the comparison. In an embodiment, the processor stops suspension if the signatures match and takes a protection action if the signatures do not match.

16 Claims, 5 Drawing Sheets

(56) References Cited

U.S. PATENT DOCUMENTS

| | | | | |
|---|---|---|---|---|
| 2010/0169972 | A1* | 7/2010 | Kuo | G06F 21/564 |
| | | | | 707/E17.001 |
| 2015/0347753 | A1* | 12/2015 | Tuvell | G06F 21/563 |
| | | | | 726/24 |
| 2016/0132365 | A1 | 5/2016 | Pan et al. | |
| 2017/0032118 | A1* | 2/2017 | Carson | G06F 21/566 |
| 2019/0068622 | A1* | 2/2019 | Lin | H04L 63/1441 |
| 2019/0317968 | A1* | 10/2019 | De Los Santos Vilchez | |
| | | | | H04L 63/1433 |
| 2020/0341962 | A1* | 10/2020 | Kreutzer | G06F 16/2358 |
| 2021/0004491 | A1* | 1/2021 | Saha | H04W 12/03 |

FOREIGN PATENT DOCUMENTS

| | | |
|---|---|---|
| WO | 2022/147469 A1 | 7/2022 |
| WO | 2023/133582 A1 | 7/2023 |

OTHER PUBLICATIONS

Intel® NUC Watchdog Timer Utility, Oct. 19, 2022., retrieved from https://www.intel.com/content/www/US/en/download/19446/29076/intel-nuc-watchdog-timer-utility.html?, 1 page.

International Search Report and Written Opinion received for PCT Patent Application No. PCT/US2021/073191, mailed on Mar. 25, 2022, 13 pages.

International Search Report and Written Opinion received for PCT Patent Application No. PCT/US2023/060374, mailed on Apr. 25, 2023, 15 pages.

Oyama, Y., et al., "Speculative security checks in sandboxing systems", Parallel And Distributed Processing Symposium, 2005. Proceedings. 19th IEEE, 2005, pp. 293b-293b.

Watchdog: a software watchdog daemon, "watchdog (8)—Linux Man Pages", Retrieved from, https://www.systutorials.com/docs/linux/man/8-watchdog/[2/2/2022, 13 pages.

* cited by examiner

ZERO DWELL TIME PROCESS LIBRARY AND SCRIPT MONITORING

RELATED APPLICATION

This application claims the benefit of U.S. Provisional Application No. 63/132,050, filed on Dec. 30, 2020.

The entire teachings of the above application are incorporated herein by reference.

BACKGROUND

With each passing day, cyber-attacks are becoming increasingly sophisticated. Attacks are often targeted to exploit specific vulnerabilities in specific programs, processes, and applications. Various methods and tools exist for protecting against these attacks, but these existing methods and tools are inadequate.

SUMMARY

Embodiments provide systems, methods, and computer program products to monitor programs, processes, and applications.

An example embodiment is directed to a process monitoring system. The system includes a centralized database storing approved file signatures. Further, the system includes a processor configured, in response to a user request to run an executable file, to suspend a process implementing execution of the executable file. After suspending the process, the processor determines a signature of the executable file and compares the determined signature of the executable file to the approved file signatures stored in the centralized database. The processor maintains or stops suspension of the process based on the comparison.

In an embodiment, in comparing the determined signature of the executable file to the approved file signatures stored in the centralized database, the processor is configured to (1) identify a given file signature stored in the centralized database matches the determined signature of the executable file or (2) determine no file signature stored in the centralized database matches the determined signature of the executable file. In such an embodiment, if the processor determines the given file signature stored in the centralized database matches the determined signature of the executable file, the processor stops suspension of the process. On the other hand, in such an embodiment, if the processor determines no file signature stored in the centralized database matches the determined signature of the executable file, the processor implements a protection action associated with the process.

According to an embodiment, the file signatures stored in the centralized database are checksums. Further, an embodiment of the system determines the signature of the executable file by calculating a checksum of the executable file.

In an example embodiment, the stored file signatures include an indication of one or more libraries associated with executable files corresponding to the stored file signatures. According to such an embodiment, the processor is further configured to determine a given library utilized by the process and compare the given library to a file signature, corresponding to the executable file, stored in the centralized database to determine if the given library corresponds to a library associated with the executable.

Another embodiment operates to build and update the signature database. In such an embodiment, the processor is further configured to receive client software data indicating at least one of package data, vendor data, certificate data, and file integrity data. Such an embodiment may also store a file signature corresponding to the received client software data in the centralized database. In yet another embodiment, the processor is further configured to receive an indication that a software package is invalid and update the centralized database to indicate that a given signature corresponding to the invalid software package is invalid. An embodiment of the system is further configured to receive an indication of at least one of allowable scripts, checksums, and arguments for a client computing device. Such an embodiment creates and stores a signature corresponding the received indication in the centralized database. Yet another embodiment is further configured to receive an indication of a user permitted to implement the at least one of the allowable scripts, checksums, and arguments. The system, in turn, stores the received indication of the user, in the centralized database, in association with the stored signature corresponding to the received indication of the least one of allowable scripts, checksums, and arguments.

In yet another embodiment, the processor is further configured to receive a registration message from an endpoint client, wherein the registration message indicates software packages and corresponding versions installed on hardware devices associated with the endpoint client. The system is configured to update approved file signatures stored in the centralized database and add new file signatures to the centralized database. In such an embodiment, the updated and new file signatures correspond with the indicated software packages and versions in the registration message.

In an embodiment, the processor is further configured, in response to finding no signature stored in the database that corresponds to the executable file, to query a website associated with a software vendor providing the executable file for data regarding the executable file. The system performs natural language processing on the data regarding the executable file to determine a valid signature for the executable file.

Moreover, in yet another embodiment, in response to receiving the user request to run the executable file, the processor is configured to tokenize the request to identify a name of the executable and search the centralized database using the identified name to determine a given signature corresponding to the executable.

The system may also be configured, prior to the comparing, to (i) check a certificate embedded in the executable for validity, and (ii) if the certificate is invalid, send a request to a file reputation service to validate the certificate.

Embodiments of the system may also identify one or more scripts associated with the process. Based upon the identified script(s), the system can identify script characteristic data, where the script characteristic data includes at least one of a command line, argument, user information, integrity data, and an associated certificate. Such an embodiment can determine if the script characteristic data is valid or invalid and use such a determination when considering to stop or maintain suspension.

The centralized database, according to yet another embodiment, is further configured to store approved library signatures, approved script signatures, and indications of approved relationships between the stored approved file signatures, stored approved library signatures, and stored approved script signatures. Thus, such an embodiment has a centralized database that includes signatures for approved executable files, and signatures for the libraries and scripts used or otherwise associated with the approved executables. Moreover, such an embodiment considers context of the executable files, libraries, and scripts by storing approved relationships amongst the executables, scripts, and libraries. In such an embodiment, the processor is further configured to (i) determine a signature of one or more libraries associated with the executable file, (ii) determine a signature of one or more scripts associated with the executable file, and (iii) determine one or more relationships between the executable file, the one or more libraries, and the one or more scripts. The system compares the determined signature of the one or more libraries, the determined signature of the one or more scripts, and the determined one or more relationships to the stored approved library signatures, stored approved script signatures, and stored indications of approved relationships between the stored approved file signatures, stored approved library signatures, and stored approved script signatures. In turn, the system maintains or stops suspension of the process based on the comparison.

Another embodiment is directed to a method for process monitoring. The method includes, in response to a user request to run an executable file, suspending a process implementing execution of the executable file. In turn, the method determines a signature of the executable file and compares the determined signature of the executable file to approved file signatures stored in a database. Then, the method maintains or stops suspension of the process based on the comparing.

Yet another embodiment is directed to a computer program product for monitoring a process. The computer program product comprises one or more non-transitory computer-readable storage devices and program instructions stored on at least one of the one or more storage devices. The program instructions, when loaded and executed by a processor, cause an apparatus associated with the processor to monitor processes as described herein. In an example embodiment, the program instructions cause an apparatus to suspend a process implementing execution of the executable file, in response to a user request to run an executable file. The program instructions then cause the apparatus to determine a signature of the executable file and compare the determined signature of the executable file to approved file signatures stored in a database. In turn, the program instructions cause the apparatus to maintain or stops suspension of the process based on the comparing.

It is noted that embodiments of the system, method, and computer program product may be configured to implement any embodiments described herein.

BRIEF DESCRIPTION OF THE DRAWINGS

The foregoing will be apparent from the following more particular description of example embodiments, as illustrated in the accompanying drawings in which like reference characters refer to the same parts throughout the different views. The drawings are not necessarily to scale, emphasis instead being placed upon illustrating embodiments.

DETAILED DESCRIPTION

Figure 1:
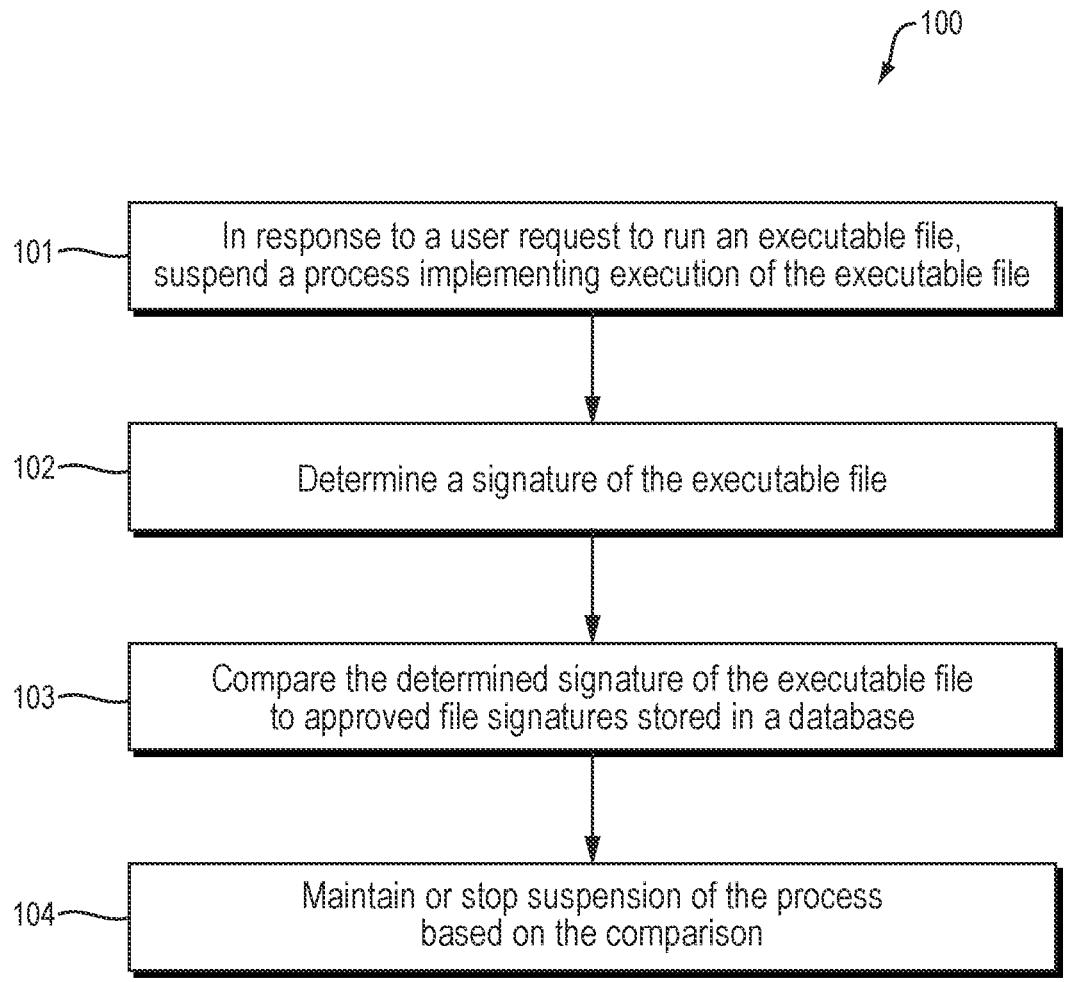
FIG. 1 is a flow diagram of a method for monitoring a process according to an embodiment.

A description of example embodiments follows. Embodiments provide improved functionality to monitor computer processes.

Many organizations leverage a change control policy which requires that code packages be specifically enumerated and rotated through the package scanning utility so that all changed packages be also registered in the file signature repository.

Existing application control cyber security solutions monitor the start of execution of a process in user space of personal endpoints by comparing the command line of the executable being launched against an "allowed" list that represents permitted software and against a "denied" list that represents known malware.

In such existing solutions, any executable whose name and checksum has an explicit match in the "allowed" list can execute. Similarly, any executable whose name and checksum has an explicit match in the "denied" list is blocked. When the security control does not find the executable in either list, the security control typically bubbles up the decision to either run or block that executable and the security control makes the user responsible for making the final decision of whether to run or block the executable.

Some sophisticated application control solutions perform an additional step of analyzing the executable in either a local "sandbox" or against a community threat feed to determine if the executable exhibits any pattern that matches characteristics of some previously known malware before said executable is either allowed to run or denied from running. In some cases, the sandbox analysis is done remotely in the data center of a file reputation service and in some cases, the sandbox can be run locally so as to avoid a round trip to the data center where the file reputation service is running.

The overall operation of the basic and advanced versions of the existing application control solutions suffers from numerous issues. First, in an organization, otherwise trusted executables (often, home grown legitimate first party or third party applications that do not have any presence outside the organization) may get "analyzed" as being malicious by the local or remote sandbox analysis tool. Similarly, some actual malware may get misclassified as not being malware and therefore allowed to execute simply because the local or remote sandbox analysis did not find anything objectionable in its analysis. Given that almost 350,000 malwares are released daily, the likelihood of such misclassification happening is very high since these newly released malwares may not exhibit a similarity to other known malware of the past.

Another problem with the existing security solutions is such solutions allow libraries to load into a process address space without analysis if the libraries attempting to load into the process have a certificate from a trusted organization. An attacker can abuse the trust by embedding their malware directly into the object code or injecting their malicious code as a backdoor into the source code or even by stealing the private keys of the organization producing said libraries.

The libraries attempting to get loaded into the process are also subjected to the above-mentioned sandbox analysis and therefore have the same limitations described above. Further, libraries attempting to get loaded are not examined for being appropriate in the context of the executable that started the process in which the library is attempting to load.

Yet another problem with existing solutions is letting executables run without examining the arguments used in the command line. Sometimes an executable may be legitimate, but one or more specific command line parameter(s) may not be considered legitimate by an organization's security policy.

Existing solutions also let interpreters run scripts without examining the arguments used in the command line. A script may or may not be considered legitimate by an organization's security policy. Further, existing solutions do not check if the executable or interpreter and the scripts in use are being run under an access control model that is explicitly considered legitimate by an organization.

Also problematically, the security analysis by existing security controls takes place in the user space and by the time the decision is made, some part (or all) of the code of the executable may have already executed. This makes the security control ineffective.

Existing security solutions are either slow to update their policies, i.e., knowledge on security vulnerabilities, or do not update their policies at all. From time to time, a software vendor may decide to deprecate a version of an executable, library, or a script. Because of their slow or non-existent updates, existing security controls miss these changes and can allow these deprecated executables, libraries, and scripts to run.

Similarly, when a vendor finds a vulnerability and patches an executable, library, or script, in existing solutions, the previous version of the executable, library, or script often does not get removed from the "allowed" list.

Yet another problem with existing security controls is requiring the application control "allow" and "deny" list to be prepared on each endpoint instance by instance.

Embodiments solve the foregoing problems and provide improved functionality to monitor computer processes.

FIG. 1 is flow chart of a method 100 for monitoring a process according to an embodiment. The method 100 is computer implemented and, as such, may be implemented using any computer device, or combination of computing devices known in the art. Further, the method 100 may be implemented in the systems described herein, e.g., the system 220 described hereinbelow in relation to FIG. 2 and the system 330 described hereinbelow in relation to FIG. 3 and the method 100 may include implementing the functionality described hereinbelow in relation to the systems 220 and 330.

The method 100 begins at step 101 by suspending a process implementing execution of the executable file. In the method 100 the suspension 101 is automatically done in response to a user request to run an executable file. According to an embodiment, the suspension 101 is done by a kernel that pauses one or more, e.g., all, threads associated with an application, e.g., the executable. In an embodiment, the kernel maintains the state of each thread. At step 102, the method 100 determines a signature of the executable file. Then, at step 103, the method 100 compares the determined signature of the executable file to approved file signatures stored in a database. In turn, at step 104, the method 100 maintains or stops suspension of the process based on the comparing.

Because the method 100 starts by suspending execution, the method 100 provides a zero-dwell time solution. In other words, embodiments provide protection immediately, with zero time occurring before protection kicks in. In this way, embodiments prevent even a single instruction from loading into a user space. Thus, not even one instruction in the user space will execute any further once the suspension is done. It can be said that the process is frozen in time.

Figure 2:
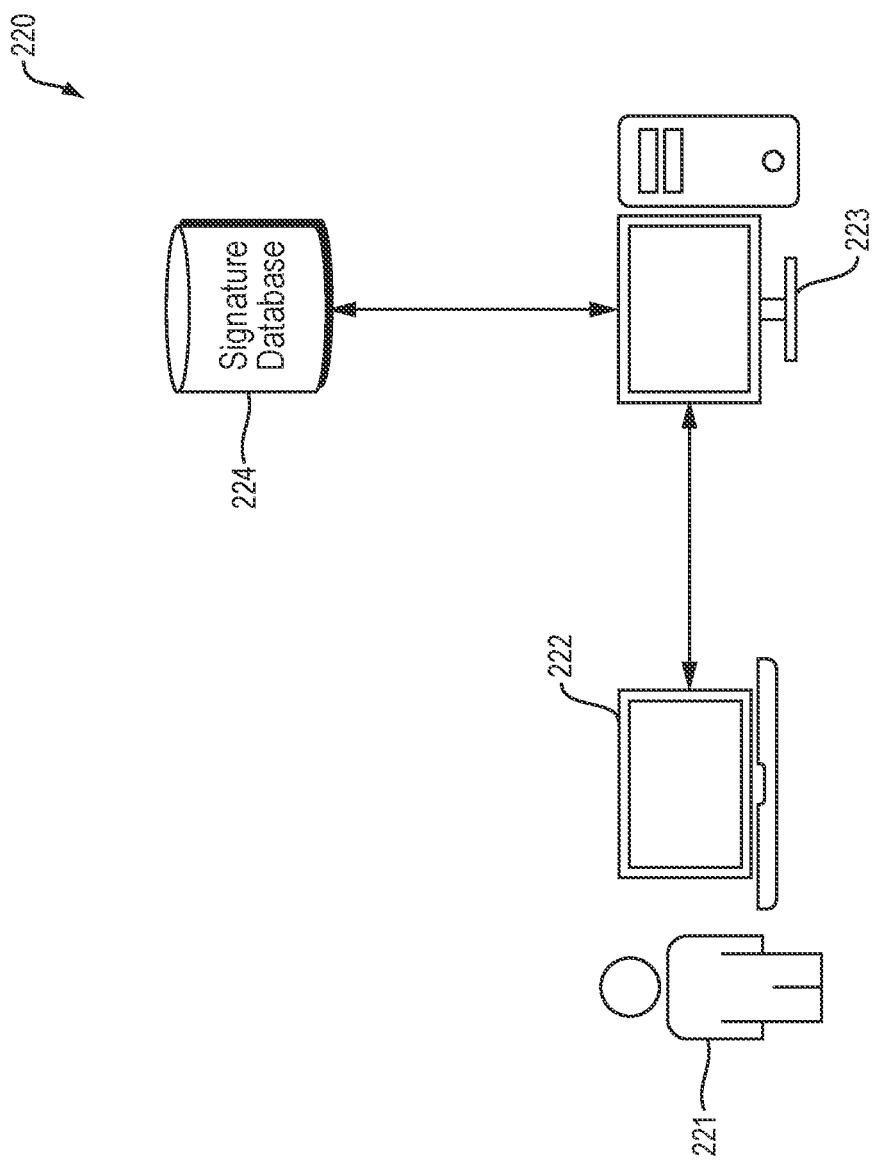
FIG. 2 is a simplified block diagram of an embodiment of a system for process monitoring.

FIG. 2 is a simplified block diagram of a process monitoring system. The system 220 includes the user 221 and the user's 221 associated computing device 222. The system 220 also includes a computing processor device 223 that is communicatively coupled to the signature database 224 and the user 221 computing device 222. In an embodiment, the monitoring computing device 223, i.e., processor, and signature database 224 are used to implement embodiments of the process monitoring functionality described herein. In an embodiment, the centralized database 224 stores approved file signatures. Moreover, the signature database 224 can store approved library signatures and approved script signatures. Further still, the signature database 224 can stored approved context information. Such context information can be tailored to specific organizations and even specific users. This context information can indicate the approved context for using the approved executable files, scripts, and libraries.

The computing processing device 223 in the system 220 is configured, in response to a user request 225 to run an executable file, to suspend a process, e.g., on the computing device 222, implementing execution of the executable file. After suspending the process, the processor 223 determines a signature of the executable file and compares the determined signature of the executable file to the approved file signatures stored in the centralized database 224. According to an embodiment, the comparison is examining if the determined signature and the approved signature are an exact match. In addition to determining if the checksum of the file is valid, in an embodiment, the processor 223 also checks if a library that is about to load is indicated by the main executable's manifest. The processor 223 maintains or stops suspension of the process based on the comparison. According to an embodiment, maintaining or stopping of suspension is controlled by a kernel. In such an embodiment, when the suspension is stopped, threads in the user space are resumed.

Because the system 220 suspends the process upon the request to run the executable, the system 220 implements a zero-trust concept where executables are not trusted unless they are verified through the comparison. Moreover, in the system 220, executables (and their associated libraries, scripts, etc.) can be considered approved based upon the existence of having a signature stored on the database 224. In this way, embodiments of the system 220 can be configured to carryout user, e.g., enterprise, intent regarding allowing/denying use of executables.

In an embodiment, comparing the determined signature of the executable file to the approved file signatures stored in the centralized database 224, includes the processor 225 identifying a given file signature stored in the centralized database 224 that matches the determined signature of the executable file or determining no file signature stored in the centralized database 224 matches the determined signature of the executable file. In such an embodiment, if the processor 223 determines a given file signature stored in the centralized database 224 matches the determined signature of the executable file, the processor 223 stops suspension of the process. On the other hand, in such an embodiment, if the processor 223 determines no file signature stored in the centralized database 224 matches the determined signature of the executable file, the processor 223 implements a protection action associated with the process.

According to an embodiment, the file signatures stored in the centralized database 224 are checksums. Moreover, an embodiment of the system 220 may determine the signature of the executable file by calculating a checksum of the executable file. This calculated checksum is then compared to approved checksums stored in the signature database 224.

In an example embodiment, the stored file signatures on the database 224 include an indication of one or more libraries associated with executable files corresponding to the stored file signatures. According to such an embodiment, the processor 223 is further configured to determine a given library utilized by the process and compare the given library to a file signature, corresponding to the executable file, stored in the centralized database 224 to determine if the given library corresponds to a library associated with the executable.

Embodiments of the system 220 may also identify one or more scripts associated with the process. Based upon the identified script, the system 220 can identify script characteristic data, where the script characteristic data includes at least one of a command line, argument, user information, integrity data, and an associated certificate. Such an embodiment can consider if the script characteristic data is valid or invalid and use such a determination when considering to stop or maintain suspension.

The centralized database 224, according to yet another embodiment, is further configured to store approved library signatures, approved script signatures, and indications of approved relationships between the stored approved file signatures, stored approved library signatures, and stored approved script signatures. In this way, the database 224 stores signatures for approved executables, approved libraries, and approved scripts. As such, approved executables, libraries and scripts are known and indications of such are stored in the database 224. Moreover, by storing indications of approved relationships amongst the approved executables, libraries, and scripts, embodiments of the method 220 can also facilitate further nuanced functionality and allow the approved executables, libraries, scripts to be implemented in an approved context. To illustrate, consider an example where executable-A is allowed, executable-B is allowed, script-A is allowed, and a relationship indicates that script-A must be utilized, i.e., associated with executable-B. If, for instance, a user tries to implement executable-A, and executable-A is going to try and invoke script-A, the system 220 will maintain suspension of the executable-A because script-A is only allowed in conjunction with executable-B. In this way, embodiments of the system 220 can implement application control policy.

In such an embodiment, the processor 223 is further configured to (i) determine a signature of one or more libraries associated with the executable file, (ii) determine a signature of one or more scripts associated with the executable file, and (iii) determine one or more relationships between the executable file, the one or more libraries, and the one or more scripts. According to an embodiment these signatures are determined by computing checksums. The processor 223 compares the determined signature of the one or more libraries, the determined signature of the one or more scripts, and the determined one or more relationships to the stored approved library signatures, stored approved script signatures, and stored indications of approved relationships between the stored approved file signatures, stored approved library signatures, and stored approved script signatures. In turn, the system maintains or stops suspension of the process based on the comparison.

An embodiment of the system 220 operates to build and update the signature database 224. In such an embodiment, the processor 223 is further configured to receive client software data indicating at least one of package data, vendor data, certificate data, and file integrity data. Such an embodiment may store one or more file signatures corresponding to the received client software data in the centralized database 224. In yet another embodiment, the processor 223 is further configured to receive an indication that a software package is invalid and update the centralized database 224 to indicate that a given signature corresponding to the invalid software package is invalid. An embodiment of the system 220 is further configured to receive an indication of at least one of allowable scripts, checksums, and arguments for a client computing device, e.g., the device 222. Such an embodiment creates and stores one or more signatures corresponding to the received indication in the centralized database 224. Yet another embodiment of the system 220 is further configured to receive an indication of a user permitted to implement the at least one of the allowable scripts, checksums, and arguments. The system 220, in turn, stores the received indication of the user, in the centralized database 224, in association with the one or more stored signatures corresponding to the received indication of the least one of allowable scripts, checksums, and arguments.

In yet another embodiment of the system 220, the processor 223 is further configured to receive a registration message from an endpoint client, wherein the registration message indicates software packages and corresponding versions installed on hardware devices associated with the endpoint client. The system 220 is configured to update approved file signatures stored in the centralized database 224 and add new file signatures to the centralized database 224 in accordance with the received registration message. In such an embodiment, the updated and new file signatures correspond with the indicated software packages and versions in the registration message.

In an embodiment, the processor 223 is further configured, in response to finding no signature stored in the database 224 that corresponds to the executable file, to query a website associated with a software vendor providing the executable file for data regarding the executable file. The system 220 performs natural language processing on the data regarding the executable file to determine a valid signature for the executable file. In such an embodiment, the system 220 is able to determine if the requested executable is acceptable even where a signature is not stored on the database 224.

Moreover, in yet another embodiment, in response to receiving the user request to run the executable file, the processor 223 is configured to tokenize the request to identify a name of the executable and search the centralized database 224 using the identified name to determine a given signature corresponding to the executable.

The system 220 may also be configured, prior to the comparing, to: (i) check a certificate embedded in the executable for validity, and (ii) if the certificate is invalid, send a request to a file reputation service to validate the certificate.

Figure 3:
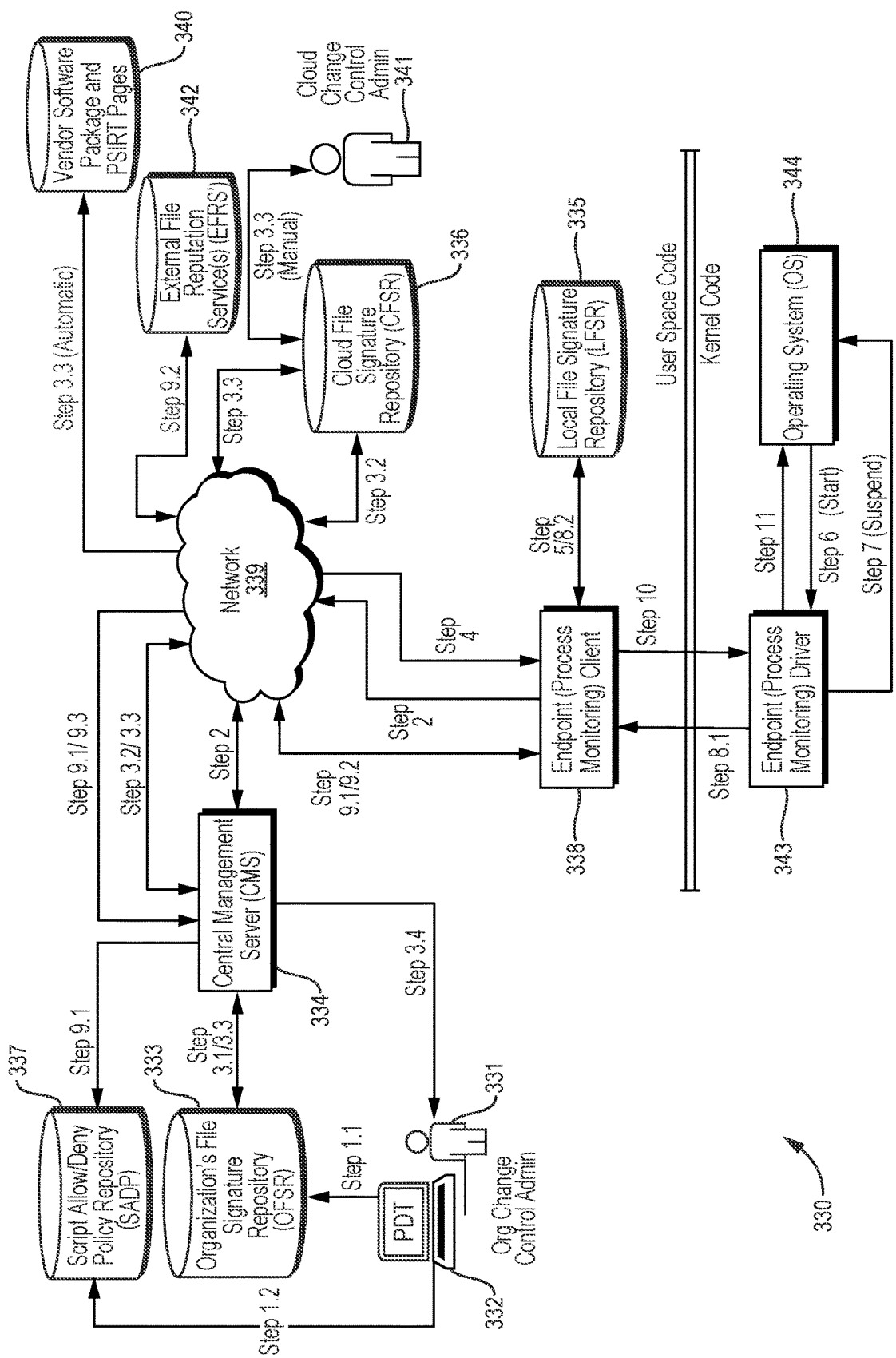
FIG. 3 is a block diagram of a system for compiling file, library, and script signatures and monitoring processes according to an embodiment.

In most organizations, information technology (IT)/information security (Infosec) runs the change management practice whereby any software package that is authorized to run in the customer's software environment (data center as well as personal compute instances) goes through an approval process. This ensures that the software environment does not get polluted with malware. FIG. 3 is a block diagram of a system 330 that may be used by IT/Infosec (or any other user) to implement change management and prevent malware from polluting a software environment using the monitoring functionality described herein. In particular, the system 330 illustrated in FIG. 3 can be used to implement a zero-dwell time process monitoring engine according to an embodiment.

In the following sections describing the functionality of the system 330, a series of messages being exchanged between a sender and receiver are described. In an example implementation, all senders and receivers have digital certificates installed. Similarly, in an embodiment, all messages that are exchanged between said senders and receivers are not only signed using certificates, but also transported in an encrypted channel. Therefore, in such an embodiment, it is not possible for an entity to alter the messages in transit without the receiver knowing about the subterfuge.

Extracting Package and File Integrity Data from Vendor Packages

Given this change management charter of the IT/Infosec team, the organization change control admin 331 unpacks vendor delivered software (in diverse package formats such as MSI, SEA, CAB, ISO, RPM, DEB, TAR, etc.) using a software tool called the Package Decomposition Tool (PDT) 332 provided with this solution 330. In an embodiment, the PDT 332 extracts the following information from the package: (1) package data, (2) vendor data, (3) certificate data, and (4) individual file integrity data.

In an embodiment, the extracted package data includes: Name, Version, Type (MSI, SEA, CAB, ISO, RPM, DEB, TAR, etc.), Checksum value, Checksum type (SHA 256, MD5, etc.), and Number of files in package. The extracted vendor data may include: Name, Software Release URL, Software Update URL, PSIRT Page URL, and NVD CPE. The extracted certificate data may include: Certificate Authority for Code Signing certificate and Public Key. Further, the individual file integrity data extracted from the package may include: Package Name and Version, File Name, File Type (executable, library, script, config, etc.), File Checksum value, File Checksum Type (SHA256, MD5, etc.), File default ACL (User/Group/ROW), File Release Date, File Vulnerability Status (Latest, Vulnerable), File deprecation Status, File Integrity Failure Protection Policy (Suspend, Terminate), and Stack of libraries referenced (if Executable), such as executable Name, Library Name, and Library checksum.

At step 1.1 the PDT 332 pushes the extracted data for each software package into the Organization's File Signature Repository (OFSR) 333 for that organization. According to an embodiment of the system 330, as new unrelated packages become available to the Org Change Control Admin 331, the process described above (extracting the data and pushing the data to the OFSR 333) is repeated.

From time to time, a software vendor may push updates of an existing software package. Alternatively, the vendor's Product Security Incident Response Team (PSIRT) page 340 for that vendor may get updated as vulnerabilities get discovered by the vendor. In either scenario, the Org Change Control Admin 331 receives an updated version of an existing package that is already in use by the organization. Some files in the package may not have changed whereas others may have changed as part of the updated package. When these changes occur, the Org Change Control Admin 331 updates the OFSR 333 with the newer package file integrity details as described above. In an embodiment, all files in the previous package version that have the same name, but a different checksum in the new package are marked as the new non-vulnerable version of the file. In addition, the older version of the said file will not only be marked as being deprecated, but also as being vulnerable if the vendor PSIRT page 340 identifies the said file as being vulnerable.

Further, a software vendor can discontinue support for a given package. On receiving a manual or automatic update from the vendor, the OFSR 333 will also update the status of the package accordingly.

In the system 330, the Central Monitoring Server (CMS) 334 maintains information regarding the endpoints that have previously requested package file integrity information for that package. This allows the CMS 334 to push the updated package and file signature information to the endpoints in question. This closed loop approach ensures that the Local File Signature Repository (LFSR) 335 is updated automatically as new versions of packages installed on the endpoint become available or if a file or support for a package is deprecated altogether.

If the customer has agreed, the package file integrity information for each "package" placed into the OFSR 333 is also dispatched to the Cloud File Signature Repository (CFSR) 336.

Script Allow/Deny Policy Repository (SADP)

In the system 330, the SADP 337 contains two separate lists—an allow list which contains the names of scripts, checksums, arguments, and user(s)/group(s) that can execute the said scripts or processes. The allow list shows the names of the interpreter, the script, and arguments that are acceptable to be run on any end point whereas the deny list is composed of specific command line options that may be otherwise legal, but not in the current organization's context.

Individual allow and deny line items can be bundled together for the purpose of implementing role-based access controls. For instance, if a user is say an InfoSec team member, the InfoSec team member user may be allowed to execute a certain set of scripts, but if a user is say, from the Finance team, a totally different set of scripts are allowed to be executed. Such information may be stored in the SADP 337. In an embodiment, the information stored in the SADP 337 is sent by the admin 331 at step 1.2. For instance, in an embodiment, the admin at step 1.2 sends indication of the scripts that are allowed for each user to the SADP 337.

Request to Build Out the Local File Signature Repository

An endpoint (via the endpoint client 338 and network 339) can send out a "Registration" message as shown in Step 2 to the Central Management Server 334 at either start up or on-demand. In either case, the Endpoint Client 338 sends out the list of packages and their versions installed on the said endpoint. This information is stored on the LFSR 335. In an embodiment, any previously received package information is purged and updated at this point.

According to an embodiment, the Operating System 344 on the endpoint is treated as a "special" package. Many OS vendors also push individual file integrity information of all the files in the "package" in a read only database file which is protected. For instance, in the case of Windows® OS, Microsoft® publishes an update to the Windows® System File Check (SFC) database each time an update to the OS or other Microsoft® packages are pushed by Microsoft®.

Handling the Local File Signature Repository Package File Integrity Request

On receipt of a specific package file integrity request message (Step 2), the CMS 334 checks the OFSR 333 for the package file integrity information for the one or more packages listed in the original message (Step 3.1). The Org Change Control Admin 331 may have previously and asynchronously placed such package file integrity information (Step 1) in the OFSR 333. In some scenarios, the one or more package file integrity information requested by the endpoint is found in the OFSR database 333, but occasionally it may be possible that the package in question may not have been previously extracted by the Org Change Control Admin 331. In that case, a OFSR 333 handler reaches out to the Cloud File Signature Repository (CFSR) 336 as shown in Step 3.2.

The package file integrity data for that package may or may not be present in the CFSR 336. If the information is available, the said data is transferred over a secure tunnel back to the OFSR 333 (Step 3.2 return path). If the package file integrity information is not present in the CFSR 336, the CFSR 336 will query the indicated software vendor's URL (Step 3.3—Automatic) and extract the package integrity data automatically from the vendor software package and PSIRT pages 340 using a natural language processing (NLP) construct described in further detail hereinbelow. If this extraction (step 3.3 automatic) operation fails, the Cloud Change Control Admin 341 is notified, and a manual intervention (Step 3.3—Manual) may become necessary for extracting the package file integrity information.

On completion of the package file integrity extraction operation, the CFSR 336 not only updates its own local database, but also pushes the data back to the requesting OFSR 333 (step 3.3 return path). It also creates a notification for the Org Change Control Admin 331 as shown in Step 3.4 in the diagram.

Parallelly, if the end-user organization has agreed that for any package file integrity information it requires, the organization will also share the product and vendor related information in the package file integrity database then, when the Org Change Control Admin 331 updates the package file integrity information of a package in the OFSR 333, the product and vendor sections of the package file integrity information is also queued up for being updated in the CFSR 336. Once again, a CFSR 336 handler can extract the package file integrity data from the software vendor's package release and PSIRT website 340. The Cloud Change Control admin 341 can either manually or automatically obtain the package using the URL information presented by the Org Change Control Admin 331. This process allows the CFSR 336 to serve a package file integrity lookup request for this package by future requestors without having to contact an external third-party file reputation service.

When responding automatically to update a package file integrity request from an organization, the CFSR 336 can crawl the indicated software vendor's release URL and PSIRT URL and use NLP constructs to tokenize the contents of a web page 340. This mechanism may leverage functionality similar to NLP processing implemented in news feed parsing. In an embodiment of the system 330, the package file integrity information is constructed from the tokenized data on the one or more web pages 340.

Responding to the Local File Signature Repository Build Request

Whether an initial package file integrity information request (step 2) from an endpoint is handled by the OFSR 333 or the CFSR 336, either a package file integrity datagram will be presented, or an incomplete response will be sent back (Step 4) to the requesting endpoint via the client 338. Sanity testing on the incoming package file integrity datagram can be performed at the endpoint before further processing. In an embodiment, the datagram is in a specific format, indicating file name and checksum. Sanity testing may determine if each record in the datagram is in this format.

Updating the Local File Signature Repository

In case a complete and valid package file integrity datagram is received, the said datagram is parsed and information saved (Step 5) in the Local File Signature Repository LFSR 335. The LFSR 335 can be implemented as a very high speed in-memory database. Please note that, in an embodiment, any other code signed by a non-deprecated software vendor certificate shall be accepted by the endpoint LFSR 335 in the future.

In an embodiment of the system 330, the signatures, e.g., checksums, are prepared ahead of time in the central file signature repository 336. When a given host wakes up, it requests signatures for all the packages installed on that workload and the signatures are transferred from the central location 336 to the host. Step 9.3 involves incremental signatures being added from time to time.

Handling New Process Startup

From time to time, a new process may need to be started interactively by a user, or by a background system service, or by a CRON job, or by some script. In either situation, the Endpoint Process Monitoring Driver 343 first tokenizes the command (Step 6) to identify the executable name and next places the process creation on hold (Step 7). The Endpoint Process Monitoring Driver 343 will also place the process on "hold" until a decision on the executable has been determined. The Endpoint Process Monitoring Driver 343 will then request the Endpoint Process Monitoring Client 338 to perform an Application Control check (Step 8.1).

The Endpoint Process Monitoring Client 338 requests the LFSR 335 (Step 8.2) for the individual executable's file integrity information (individual file integrity data may include: Package Name and Version, File Name, File Type (executable, library, script, config, etc.), File Checksum value, File Checksum Type (SHA256, MD5, etc.), File default ACL (User/Group/ROW), File Release Date, File Vulnerability Status (Latest, Vulnerable), File deprecation Status, File Integrity Failure Protection Policy (Suspend, Terminate), and Stack of libraries referenced (if Executable), such as executable Name, Library Name, and Library checksum).

In some cases, the LFSR 335 may not have the desired file's integrity information. When this occurs, the system 330 will check the certificate (if any) embedded in the executable's code. If the certificate embedded in the executable matches a trusted and unexpired certificate then the Endpoint Process Monitoring Client 338 will signal the Endpoint Process Monitoring Driver 343 in the affirmative, i.e., that the executable is acceptable. If the certificate information is missing or is not valid or does not match an existing acceptable certificate, the Endpoint Process Monitoring Client 338 will reach out to one or more an external file reputation service (EFRS) 342 such as Virus Total, Reversing Labs etc., as shown in Step 9.2. On receipt of the decision from the EFRS 342, the result is conveyed back to the Endpoint Process Monitoring Client 338 (Step 9.2). Further, if integrity information is not present in the LFSR (335), the endpoint client 338, can check the script allow/deny policy repository to determine validity of implementing a script (step 9.1)

Protection Action for Rogue Process Startup Event

Based on the LFSR 335, Certificate, and/or File Reputation Service Lookup 342, a file integrity decision is determined and conveyed by the Endpoint Process Monitoring Client 338 to the Endpoint Process Monitoring Driver 343 (Step 10). The go-no-go decision is relayed to the OS API 344 (Step 11) that previously suspended the process. If the file integrity of the executable checks out, then the process is resumed. If the file integrity does not check out, a protection action associated with said process kicks in. If the protection action is to terminate the process, then the OS 344 shall terminate the process.

Handling New Library Load

From time to time, a new library may need to be loaded into the process. When this occurs, the Endpoint Process Monitoring Driver 343 extracts the name of the library and suspends the process (Step 7). The Endpoint Process Monitoring Driver 343 then requests the Endpoint Process Monitoring Client 338 for an Application Control check (Step 8.1).

The Endpoint Process Monitoring Client 338 shall reference the stack of libraries associated with the parent executable and ensure that the library that is loading is present in the stack of libraries.

The Endpoint Process Monitoring Client 338 will also request the LFSR 335 (Step 8.2) for the individual library's file integrity information (individual file integrity data may include: Package Name and Version, File Name, File Type (executable, library, script, config, etc.), File Checksum value, File Checksum Type (SHA256, MD5, etc.), File default ACL (User/Group/ROW), File Release Date, File Vulnerability Status (Latest, Vulnerable), File deprecation Status, File Integrity Failure Protection Policy (Suspend, Terminate), and Stack of libraries referenced (if Executable), such as executable Name, Library Name, and Library checksum).

In some cases, the LFSR 335 may not have the desired library's integrity information. In that case, the Endpoint Process Monitoring Client 338 will reach out to one or more an external file reputation service (EFRS) 342 such as Virus Total, Reversing Labs etc. as shown in Step 9.2. On receipt of the integrity information from the EFRS 342, the result is conveyed back to the Endpoint Process Monitoring Client 338 (Step 9.2).

Based on the LFSR 335 lookup or Certificate lookup, or File Reputation Lookup 342, the file (library) integrity will either check out or not. If the checksum of the library attempting to start checks out as being part of an existing package and the file contents not having been altered, the Process Monitoring Client 338 will send its affirmative response to the Endpoint Process Monitoring Driver 343 (Step 10).

Protection Action for Rogue Library Load Event

Based on the LFSR 335, Certificate, or File Reputation Service Lookup 342, a file integrity decision is arrived at and conveyed by the Endpoint Process Monitoring Client 338 to the Endpoint Process Monitoring Driver 343 (Step 10). The go-no-go decision is relayed to the OS API 344 (Step 11) that previously suspended the process associated with the library. If the file integrity of the library checks out then the process is resumed. If the file integrity does not check out, the protection action associated with the said process kicks in. If the protection action is to terminate the process, then the OS 344 shall terminate the process.

Handling New Script Load

From time to time, a new script may need to be executed. The Endpoint Process Monitoring Driver 343 extracts the command line, the script, the arguments, and the user information while suspending the process (Step 7). The Endpoint Process Monitoring Driver 343 then requests the Endpoint Process Monitoring Client 338 for an Application Control check (Step 8.1).

The first thing the Endpoint Process Monitor Client 338 does is to check the combination of the command line and user launching the script against individual and bundled allow and deny lists associated with the specified user (Step 8.2). If the result of the lookup is negative (i.e., not allowed), the Endpoint Process Monitoring Client 338 returns the negative result to the Endpoint Process Monitoring Driver 343 in Step 10. A negative result can be obtained even if the script and executable name matches, but the arguments do not match.

If the above-mentioned look up is affirmative (i.e., allowed), the Endpoint Process Monitoring Client 338 proceeds to the next check which involves examining the file integrity information of both the executable and the script. Again, the result returned can be negative or positive. If the result of this lookup is negative, then the Endpoint Process Monitoring Client 338 returns the response back to the Endpoint Process Monitoring Driver 343 in Step 10.

A last optional (based on end-user policy) check that can be performed is to check the certificate embedded with the script. If the certificate is a trusted certificate then a positive result is returned otherwise a negative result is returned. The Endpoint Process Monitoring Client 338 responds back to the Endpoint Process Monitoring Driver 343 in Step 10 with the result of this check.

Protection Action for Rogue Script Execution Event

Based on the LFSR 335 and/or Certificate Lookup, a file integrity decision is made and conveyed by the Endpoint Process Monitoring Client 338 to the Endpoint Process Monitoring Driver 343 (Step 10). The go-no-go decision is relayed to the OS API 344 (Step 11) that previously suspended the process. If the file integrity of the executable and the script and user checks out, then, the previously suspended process is resumed. If the file integrity does not check out, a protection action associated with the said process kicks in. If the protection action is to terminate the process, then the OS 344 terminates the process.

Risk Assessment

An embodiment of the system 330 implements a risk assessment process that examines the details of executables and libraries that are still running on the endpoint. This process reports on any process that has become vulnerable after being launched in a good state. This allows the SecOps to become aware of the risk that is being carried and to patch/protect such a process as soon as possible.

Preventing Endpoint Process Monitoring Infrastructure from Being Maliciously Terminated Malware may attempt to terminate the Endpoint Process Monitoring 343 infrastructure. Fortunately, the hardware chipset provides a recovery mechanism whereby processes that have got into trouble can be restarted automatically. Embodiments can implement such functionality as described: (1) For Windows: https://downloadcenter.intel.com/download/29076/Intel-NUC-Watchdog-Timer-Driver and (2) For Linux: https://www.systutorials.com/docs/linux/man/8-watchdog/

Embodiments, e.g., the method 100, system 220, and system 330 have numerous advantages compared to existing functionality and solve the problems with existing functionality described hereinabove.

Embodiments extend the developer chain of trust into the enterprise. Only named executables from specified vendors and specified versions can run. Other legitimate or illegitimate (such as malware) executables are summarily denied execution privilege. Further, the current solution effectively sidesteps the executable classification problem by using a whitelist principle.

Moreover, unlike competing solutions that check integrity of only executables, the embodiments described herein check if a library attempting to load into the process address space is pristine or not. Even one unsigned, hijacked, or injected library can cause the process to get suspended in real time before malicious code gets to run. Further, embodiments do not perform pattern-based malware analysis on libraries. Instead, embodiments rely on the developer chain of trust, file integrity, and contextual appropriateness to either allow or deny a library to execute.

The embodiments extract the libraries that are attempting to execute directly from the executable. Therefore, if an executable's imports do not require the library attempting to load then even if the library may be pristine, it will not get loaded into the process address space. The security policy implemented by embodiments also ensures even command line arguments meet the corporate security policy guidelines.

Malicious scripts can cause fileless attacks to be mounted in process memory. The proposed embodiments ensure the combination of interpreter, script, arguments, and user meet the security policy of the organization.

Moreover, before executing a script, the embodiments check the legitimacy of the new process against a security policy. If the user attempting to execute the process does not match up with what is stated in the security policy, the process will not get started.

Embodiments place the process creation on hold thereby ensuring not even one instruction executes. This reduces the dwell time of malware to zero. In current solutions, short duration executables can run to completion.

Existing solutions build the application control whitelist one endpoint and one process at a time. For a large enterprise, this can become very tedious and impedes the adoption of the solution. The embodiments extend the developer's root of trust into the enterprise and the file integrity information is available with the central management solution itself. This means that any endpoint can automatically obtain the whitelist without going through an extended "learning" period.

The embodiments track any code found to have become vulnerable at some point in time. When a process is created using vulnerable executables or libraries, the SecOps team is immediately informed of such an event. This prevents vulnerable processes from going unnoticed for long periods of time. Moreover, because embodiments bundle the script allow and deny lists on the basis of RBAC, InfoSec can dispatch a consistent security policy to all end points in one shot.

Figure 4:
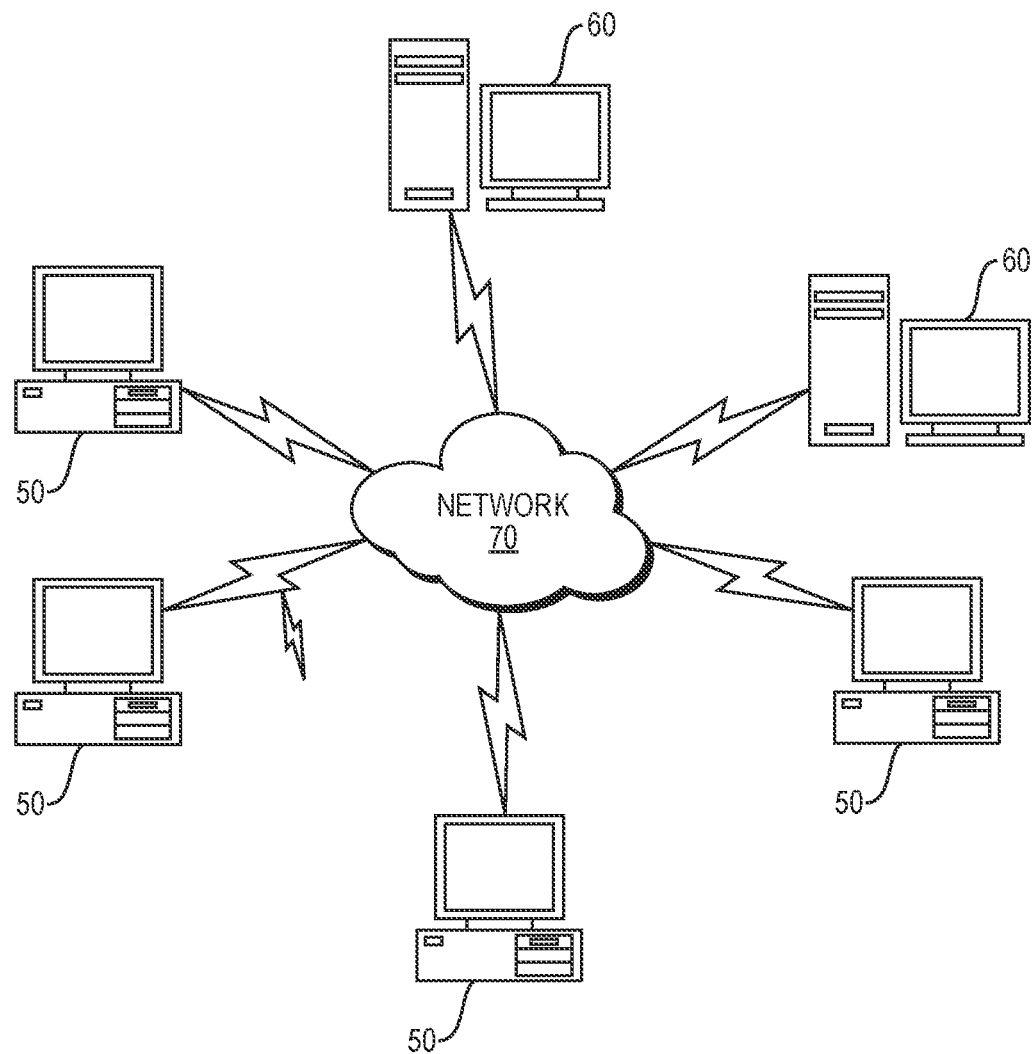
FIG. 4 illustrates a computer network or similar digital processing environment in which embodiments may be implemented.

FIG. 4 illustrates a computer network or similar digital processing environment in which embodiments of the present disclosure may be implemented.

Client computer(s)/devices 50 and server computer(s) 60 provide processing, storage, and input/output devices executing application programs and the like. The client computer(s)/devices 50 can also be linked through communications network 70 to other computing devices, including other client devices/processes 50 and server computer(s) 60. The communications network 70 can be part of a remote access network, a global network (e.g., the Internet), a worldwide collection of computers, local area or wide area networks, and gateways that currently use respective protocols (TCP/IP, Bluetooth®, etc.) to communicate with one another. Other electronic device/computer network architectures are suitable.

Client computers/devices 50 and/or servers 60 may be configured, alone or in combination, to implement the embodiments described herein, e.g., the method 100, amongst other examples. The server computers 60 may not be separate server computers but part of cloud network 70.

Figure 5:
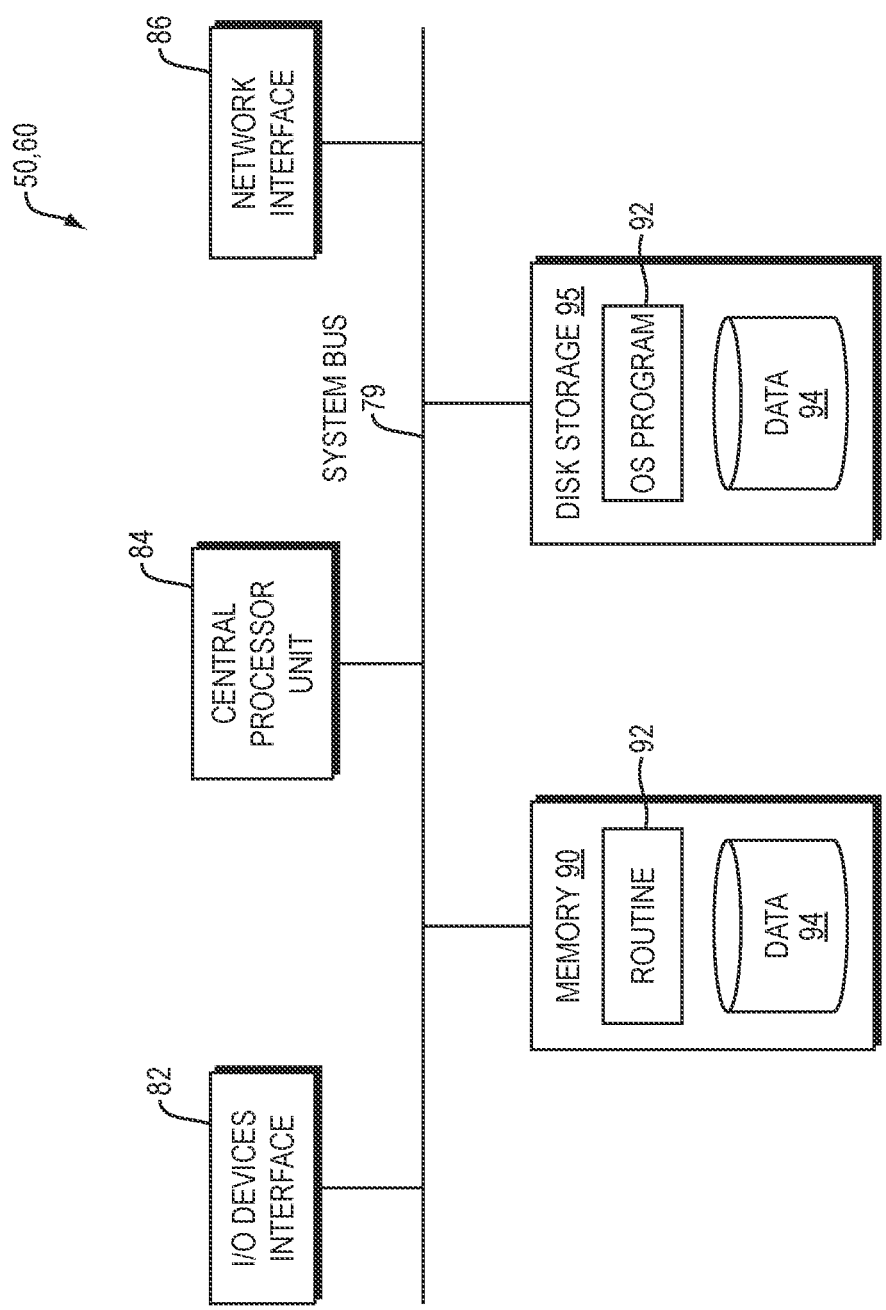
FIG. 5 is a diagram illustrating an example internal structure of a computer in the environment of FIG. 4.

FIG. 5 is a diagram of an example internal structure of a computer (e.g., client processor/device 50 or server computers 60) in the computer system of FIG. 4. Each computer 50, 60 contains a system bus 79, where a bus is a set of hardware lines used for data transfer among the components of a computer or processing system. The system bus 79 is essentially a shared conduit that connects different elements of a computer system (e.g., processor, disk storage, memory, input/output ports, network ports, etc.) that enables the transfer of information between the elements. Attached to the system bus 79 is an input/output (I/O) device interface 82 for connecting various input and output devices (e.g., keyboard, mouse, displays, printers, speakers, etc.) to the computer 50, 60. A network interface 86 allows the computer to connect to various other devices attached to a network (e.g., network 70 of FIG. 4). Memory 90 provides volatile storage for computer software instructions 92 and data 94 used to implement an embodiment of the present disclosure (e.g., the method 100, amongst others). Disk storage 95 provides non-volatile storage for computer software instructions 92 and data 94 used to implement an embodiment of the present disclosure. A central processor unit 84 is also attached to the system bus 79 and provides for the execution of computer instructions.

Embodiments or aspects thereof may be implemented in the form of hardware including but not limited to hardware circuitry, firmware, or software. If implemented in software, the software may be stored on any non-transient computer readable medium that is configured to enable a processor to load the software or subsets of instructions thereof. The processor then executes the instructions and is configured to operate or cause an apparatus to operate in a manner as described herein.

Further, hardware, firmware, software, routines, or instructions may be described herein as performing certain actions and/or functions of the data processors. However, it should be appreciated that such descriptions contained herein are merely for convenience and that such actions in fact result from computing devices, processors, controllers, or other devices executing the firmware, software, routines, instructions, etc.

It should be understood that the flow diagrams, block diagrams, and network diagrams may include more or fewer elements, be arranged differently, or be represented differently. But it further should be understood that certain implementations may dictate the block and network diagrams and the number of block and network diagrams illustrating the execution of the embodiments be implemented in a particular way.

Accordingly, further embodiments may also be implemented in a variety of computer architectures, physical, virtual, cloud computers, and/or some combination thereof, and, thus, the data processors described herein are intended for purposes of illustration only and not as a limitation of the embodiments.

The teachings of all patents, published applications and references cited herein are incorporated by reference in their entirety.

While example embodiments have been particularly shown and described, it will be understood by those skilled in the art that various changes in form and details may be made therein without departing from the scope of the embodiments encompassed by the appended claims.

What is claimed is:

1. A computer-based process monitoring system, the system comprising:
   a centralized database storing approved file signatures; and
   a processor configured, in response to a user request to run an executable file, to:
      suspend a process implementing execution of the executable file;
      determine a signature of the executable file;
      compare the determined signature of the executable file to the approved file signatures stored in the centralized database to: (i) identify a given file signature of the approved file signatures stored in the centralized database matches the determined signature of the executable file or (ii) determine no file signature of the approved file signatures stored in the centralized database matches the determined signature of the executable file; and
      maintain or stop suspension of the process based on the comparison, wherein the maintaining or stopping comprises: (i) in response to identifying the given file signature stored in the centralized database matches the determined signature of the executable file, stopping suspension of the process and (ii) in response to determining no file signature stored in the centralized database matches the determined signature of the executable file, implementing a protection action associated with the process.

2. The system of claim 1 wherein the file signatures stored in the centralized database are checksums.

3. The system of claim 1 wherein, to determine the signature of the executable file, the processor is configured to:
   calculate a checksum of the executable file.

4. The system of claim 1 wherein, the stored file signatures include an indication of one or more libraries associated with executable files corresponding to the stored file signatures, and where the processor is further configured, in response to the user request to run the executable file, to:
   determine a given library utilized by the process; and
   compare the given library to a file signature, corresponding to the executable file, stored in the centralized database to determine if the given library corresponds to a library associated with the executable.

5. The system of claim 1 wherein the processor is further configured to:
   receive client software data indicating at least one of package data, vendor data, certificate data, and file integrity data; and
   store a file signature corresponding to the received client software data in the centralized database.

6. The system of claim 1 wherein the processor is further configured to:
   receive an indication that a software package is invalid; and
   update the centralized database to indicate that a given signature corresponding to the invalid software package is invalid.

7. The system of claim 1 wherein the processor is further configured to:
   receive an indication of at least one of allowable scripts, checksums, and arguments for a client computing device; and
   create and store a signature corresponding the received indication in the centralized database.

8. The system of claim 7 wherein the processor is further configured to:
   receive an indication of a user permitted to implement the at least one of the allowable scripts, checksums, and arguments; and
   store the received indication of the user, in the centralized database, in association with the stored signature corresponding to the received indication of the least one of allowable scripts, checksums, and arguments.

9. The system of claim 1 wherein the processor is further configured to:
   receive a registration message from an endpoint client, wherein the registration message indicates software packages and corresponding versions installed on hardware devices associated with the endpoint client; and
   update approved file signatures stored in the centralized database and add new file signatures to the centralized database, wherein the updated and new file signatures correspond with the indicated software packages and versions in the registration message.

10. The system of claim 1 wherein the processor is further configured, in response to finding no signature stored in the database that corresponds to the executable file, to:
    query a website associated with a software vendor providing the executable file for data regarding the executable file; and
    perform natural language processing on the data regarding the executable file to determine a valid signature for the executable file.

11. The system of claim 1 wherein the processor is further configured, in response to the user request to run the executable file, to:
    tokenize the request to identify a name of the executable; and
    search the centralized database using the identified name to determine a given signature corresponding to the executable file.

12. The system of claim 1 wherein, the processor is further configured to:
    prior to the comparing (i) check a certificate embedded in the executable for validity, and (ii) if the certificate is invalid, send a request to a file reputation service to validate the certificate.

13. The system of claim 1 wherein the processor is further configured to:
    identify a script associated with the process;
    based upon the identified script, identify script characteristic data, wherein the script characteristic data includes at least one of a command line, argument, user information, integrity data, and an associated certificate; and
    determine if the script characteristic data is valid or invalid.

14. The system of claim 1 wherein:
    the centralized database is further configured to store approved library signatures, approved script signatures, and indications of approved relationships between the stored approved file signatures, stored approved library signatures, and stored approved script signatures; and
    the processor is further configured to:
       determine a signature of one or more libraries associated with the executable file;
       determine a signature of one or more scripts associated with the executable file;
       determine one or more relationships between the executable file, the one or more libraries, and the one or more scripts;

compare the determined signature of the one or more libraries, the determined signature of the one or more scripts, and the determined one or more relationships to the stored approved library signatures, stored approved script signatures, and stored indications of approved relationships between the stored approved file signatures, stored approved library signatures, and stored approved script signatures; and maintain or stop suspension of the process based on the comparison.

15. A method for monitoring a process, the method comprising:

in response to a user request to run an executable file, suspending a process implementing execution of the executable file;

determining a signature of the executable file;

comparing the determined signature of the executable file to approved file signatures stored in a database to: (i) identify a given file signature of the approved file signatures stored in the centralized database matches the determined signature of the executable file or (ii) determine no file signature of the approved file signatures stored in the centralized database matches the determined signature of the executable file; and maintaining or stopping suspension of the process based on the comparing, wherein the maintaining or stopping comprises: (i) in response to identifying the given file signature stored in the centralized database matches the determined signature of the executable file, stopping suspension of the process and (ii) in response to determining no file signature stored in the centralized database matches the determined signature of the executable file, implementing a protection action associated with the process.

16. A computer program product for monitoring a system, the computer program product comprising:

one or more non-transitory computer-readable storage devices and program instructions stored on at least one of the one or more storage devices, the program instructions, when loaded and executed by a processor, cause an apparatus associated with the processor to:

in response to a user request to run an executable file, suspend a process implementing execution of the executable file;

determine a signature of the executable file;

compare the determined signature of the executable file to approved file signatures stored in a database to: (i) identify a given file signature of the approved file signatures stored in the centralized database matches the determined signature of the executable file or (ii) determine no file signature of the approved file signatures stored in the centralized database matches the determined signature of the executable file; and maintain or stop suspension of the process based on the comparing wherein the maintaining or stopping comprises: (i) in response to identifying the given file signature stored in the centralized database matches the determined signature of the executable file, stopping suspension of the process and (ii) in response to determining no file signature stored in the centralized database matches the determined signature of the executable file, implementing a protection action associated with the process.

* * * * *